United States Patent [19]

Van De Bogart

[11] Patent Number: 4,480,949

[45] Date of Patent: Nov. 6, 1984

[54] COMBINATION OPPOSED HELIX ROUTER FOR ROUTING COMPOSITE MATERIAL FACE SHEETS HAVING HONEYCOMB CORE

[75] Inventor: Lloyd J. Van De Bogart, Seattle, Wash.

[73] Assignee: The Boeing Company, Seattle, Wash.

[21] Appl. No.: 383,374

[22] Filed: May 28, 1982

[51] Int. Cl.³ ............................................. B23C 5/10
[52] U.S. Cl. .................................... 407/54; 408/230
[58] Field of Search .................. 409/131, 132; 408/1, 408/230; 407/53, 54

[56] References Cited

U.S. PATENT DOCUMENTS

| | | | |
|---|---|---|---|
| 2,377,329 | 6/1945 | Dettmer | 407/53 |
| 3,003,224 | 10/1961 | Ribich | 407/54 |
| 3,863,316 | 2/1975 | Yeo | 407/54 |
| 3,913,196 | 10/1975 | Maday | 407/54 |
| 4,274,771 | 6/1981 | Nishimura | 408/230 |

Primary Examiner—Z. R. Bilinsky
Attorney, Agent, or Firm—Conrad O. Gardner; Bernard A. Donahue

[57] ABSTRACT

The combination opposed helix router having an opposed helix 70 degree left-hand upper portion and a lower portion consisting of a 45 degree helix. The combination opposed helix router is utilized for edge trimming and preparing holes in composite material face sheets with honeycomb core wherein the left-hand helix forces the face sheet fibers downward, thereby shearing them off, while the right-hand, or lower portion, forces the fibers on the lower surface upward, thereby shearing them off which operation eliminates the heavy burr normally present on the outer surface of the honeycomb sandwich during conventional routing.

1 Claim, 3 Drawing Figures

COMBINATION OPPOSED HELIX ROUTER FOR ROUTING COMPOSITE MATERIAL FACE SHEETS HAVING HONEYCOMB CORE

The present invention relates to a cutting tool and, more particularly, to a combination opposed helix router for peripheral trimming and preparing holes in composite material face sheets having a honeycomb core.

Earliest U.S. patents are found in the prior art literature which include various teachings of drills, reamers, and cutters with reverse helix cuts to perform specific functions such as reaming and countersinking with one tool. Included in the patent literature are U.S. Pat. No. 1,643,679, issued Sept. 27, 1927, and U.S. Pat. No. 4,274,771, issued June 23, 1981, neither of which is specifically directed to a deburring method and tool as hereinafter described.

Accordingly, it is an object of the present invention to provide a router for cutting a composite material having outer face sheets in which a heavy burr on the exit or lower surface of the routed panel is eliminated in the cutting process.

It is a further object of the present invention to provide a cutter for generating the holes in composite honeycomb, when the face sheets of the honeycomb core are a lay-up of resin and fiber which are difficult to machine, by turning in the burr between the face sheets for acceptable and satisfactory results.

In accordance with a preferred embodiment of the present invention, a combination opposed helix router for routing composite material face sheets with honeycomb core includes a combination opposed helix 70 degree left-hand upper portion and a lower portion consisting of a 45 degree helix. In use, in accordance with the method of the preferred embodiment, the left-hand helix forces the polyamide fibers of the upper face sheet downwardly and shears them off while the right-hand, or lower, helix portion forces the fibers on the lower surface sheet upwardly and shears them off, thereby eliminating heavy burrs on the outer surface of the honeycomb sandwich.

Other objects and advantageous features of the preferred embodiment of the present invention will become rapidly apparent in view of the following detailed description taken in conjunction with the drawing in which.

Figure 1:
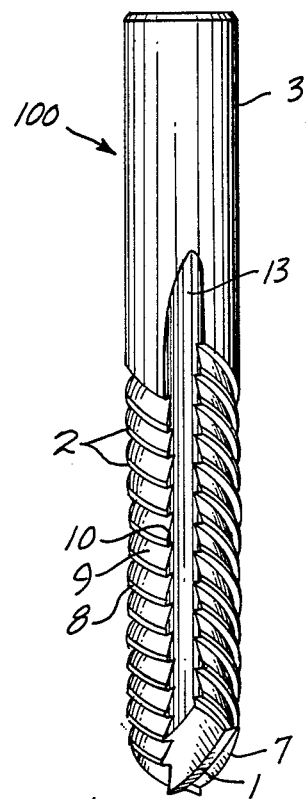
FIG. 1 is a side elevational view of a preferred embodiment of the present combination opposed helix router.
Figure 3:
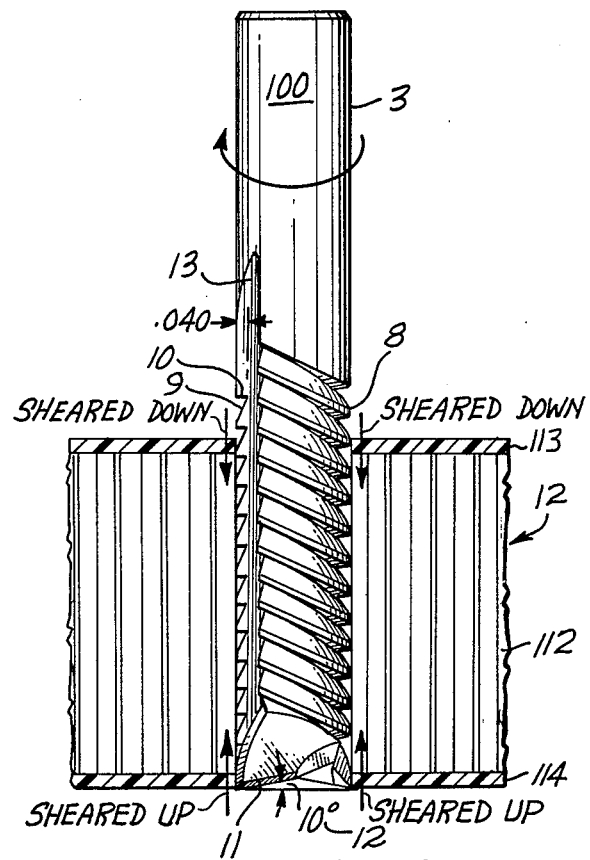
Figure 2:
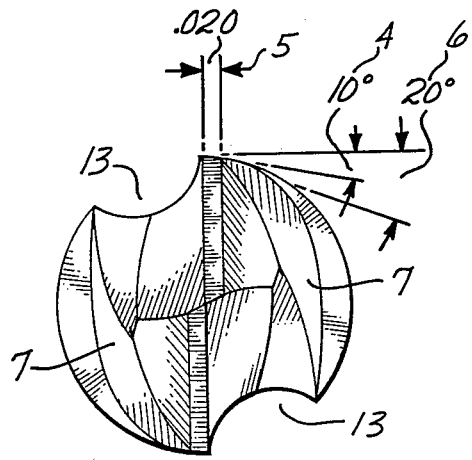
FIG. 2 is a front end elevation of the combination opposed helix router of FIG. 1; and, FIG. 3 is a further side elevational view of the opposed helix router shown in FIGS. 1 and 2 illustrative of the cutting process through a section of honeycomb core having outer composite material face sheets.

Turning now to FIGS. 1, 2, and 3 showing the preferred embodiment of the present combination opposed helix router 100, it can be seen that right-hand cutting two flute 13 router 100 combines a 45 degree right-hand helix angle cutting edge 1 to shear fibers up (as seen in FIG. 3), and a 70 degree left-hand helix angle cutting edge 2 to shear fibers down. Combination opposed helix router 100 enables trimming of composite sandwich panel structures 12 while providing a burr-free edge. Sandwich panel 12 includes a honeycomb core portion 112 of Nomex, a resin-impregnated paper made by Hexcel Company of Dublin, Calif. Honeycomb core portion 12 is sandwiched between an upper sheet 113 and lower sheet 114 which sheets 113 and 114 include Kevlar fiber, a polyamide fiber made by DuPont Company, Wilmington, Del. Face sheets 113 and 114 which include the aforementioned cured resin-impregnated polyamide fibers are shown subject to the shearing forces imparted by combination opposed helix router 100 in FIG. 3.

Combination opposed helix 100, which is made from a solid carbide material, includes a straight shank portion 3. The lower section of combination opposed helix router 100 includes two cutting edges 1 ground on a 45 degree right-hand helix angle and are of one-fourth inch in length, a 10 degree primary clearance angle 4 includes 0.020 inch wide land 5, a 20 degree secondary clearance angle 6 is further provided. The area at 7 behind clearance angle 6 is ground down to give clearance for the aforementioned cutting edge 2.

The upper section of combination opposed helix router 100 between lower section cutting edges 1 and main shank portion 3 is provided with the aforementioned multiple cutting edges 2 ground on a 70 degree left-hand helix angle, and further includes a 20 degree primary clearance angle 0.030 inch wide land 8, and a 30 degree secondary clearance angle 9 with a 10 degree positive radial rake angle 10 of 0.040 inch depth. The end edge 11 of the lower section of combination opposed helix router 100 is ground 10 degrees with a primary clearance angle and 0.020 inch wide land, 20 degree secondary clearance angle, and 10 degree dish angle 12.

The aforementioned combination opposed helix router geometries prevent the remainder of a heavy burr on the exit or lower surface of routed panel member 12, viz at the exit of surface sheet 114.

70 degree left-hand helix 2 and 45 degree right-hand helix 1, shown in FIG. 1 of the present combination opposed helix router 100, enable the left-hand helix to force the polyamide fibers in upper face sheet 113 (as seen in FIG. 3) downward to shear them off. Right-hand helix 1 forces the fibers in lower face sheet 114 upward, thereby shearing them off and enabling satisfactory cutting in preparation of holes in sandwich panel structure 12.

In an actual application of the present invention when making holes in an aircraft interior, holes are generated in interior composite panels utilizing e.g. a one-quarter inch diameter or three-eights inch diameter cutter in accordance with the preferred embodiment which is numerically control programmed to generate 0.450 inch and 0.640 inch diameter holes.

I claim:
1. A router having a shank end and a cutting portion, said cutting portion including:
   a lower section having two cutting edges ground on a right-hand helix angle one-fourth inch in length, having a 10 degree primary clearance angle of 0.020 inch width land, and a secondary clearance angle, the area behind said secondary clearance providing clearance for a further cutting edge; and,
   an upper section disposed between said lower section and said shank end, said upper section having multiple cutting edges ground on a 70 degree left-hand helix, a 20 degree primary clearance angle of 0.030 inch width, and a 30 degree secondary clearance angle with 10 degree positive rake angle 0.040 inches in depth; and
   said lower section including an end portion ground with 10 degree primary clearance angle and 0.020 inch width land, a 20 degree secondary clearance angle, and 10 degree dish angle.

* * * * *